Nov. 30, 1971     A. N. KNAUF     3,623,234

REMOVING WATER FROM CALCIUM SULPHATE

Filed May 27, 1969     2 Sheets-Sheet 1

INVENTOR.
A. N. KNAUF
BY Holman, Glascock,
Downing & Seebold
ATTORNEYS 3,623,234
REMOVING WATER FROM CALCIUM SULPHATE
Alfons Nikolaus Knauf, Haus Heilgenborn,
Siersburg, Saar, Germany
Filed May 27, 1969, Ser. No. 828,223
Claims priority, application Germany, May 31, 1968,
P 17 71 502.5
Int. Cl. F26b 3/06
U.S. Cl. 34—25                                    7 Claims

ABSTRACT OF THE DISCLOSURE

When heating calcium sulphate to remove water from it, the calcium sulphate is usually placed on a moving grate and heat is applied from the top being drawn through the calcium sulphate and grate into chambers. However, when the drawing fans are locally placed to one side or the other of the moving grate, a greater amount of air is drawn through that side of the moving grate adjacent the fan. To overcome this problem, the moving grate is supplied with a smaller free cross-section per unit area adjacent the edges of the moving grate, and preferably adjacent that edge where the fan is located. Consequently, less gas can be drawn through that portion of the grate which, because of the greater pressure at that portion, tends to permit a uniform amount of gas to be drawn through the moving grate across its width. This adjusting of the free cross-section of the grate gives a rough regulation of the gas flow resistance through the calcium sulphate, and the fine regulation is afforded by providing at least two layers of calcium sulphate on the moving grate, each layer having particles of the same size but the bottom-most layer having particles smaller than each layer there above, and varying the height of the lower layer adjacent to the side of the movable grate. This variation in height gives a fine regulation of the gas-flow resistance through the calcium sulphate.

---

The present invention relates to the removal of water from water-containing calcium sulphate and more particularly, though not exclusively, to the removal of water from several forms of calcium sulphate, for instance gypsum in a single working operation. The layers, which can be arranged horizontally or vertically, are passed continuously through a heating zone and the heating gases are drawn or blown through the calcium sulphate.

One aim of the invention is to make possible an even firing of the calcium sulphate over the whole breadth of the grate belt. A further aim of the invention is to protect the grate belt at both sides against over-heating. In accordance with a further aim of the invention it is assumed that the suction draught drawing the heating gases is greater at one side of the grate belt than at the other. Therefore, the invention has the purpose of increasing the resistance to flow through the calcium sulphate bed at one or both sides. Finally an aim of the invention is to make it possible to regulate the resistance to flow through the calcium sulfate bed.

One method disclosed herein of removing water from water-containing calcium sulphate comprises passing the calcium sulphate in layers through a first heating zone part in which hot gases are forced through the calcium sulphate and into a second heating zone part in which gases are forced through the calcium sulphate layers and then caused to pass through the heating zone a second time, and the calcium sulphate is then passed into a cooling zone in which fresh air is forced through it and then used at least partially as secondary air for the heating zone. The length of the first heating zone part being such that the gases leaving the calcium sulphate in it have a mean temperature lying slightly above the dew point. It is found that with the use of a small length for the first part of the heating zone the gases leave the calcium sulphate at a temperature below the dew point while if the length of the first part of the zone is increased the heat content of the gases leaving the calcium sulphate is excessive owing to the increase in the temperature of the calcium sulphate in the direction of transport and therefore, the hot gases passing through the calcium sulphate supply less and less heat to it as the distance from the beginning of the heating zone increases. A favourable temperature for the gases leaving the calcium sulphate is about 100° C. The gases drawn off from the second part of the heating zone can, for example, be used as tertiary air passed into the heating zone so that the temperature of the gases acting on the calcium sulphate is maintained at an optimum value.

The fresh air drawn in the cooling zone through the calcium sulphate from the atmosphere can be led separately from the products of combustion which have passed through the calcium sulphate in a second part of the heating zone, though it is also possible for the two sorts of gas to be supplied to the heating zone. In the latter case it is convenient if the gases are drawn off from the second part of the heating zone together with the fresh air from the cooling zone, for instance by means of a plenum chamber placed under the cooling zone and under the second part of the heating zone. The mixture of the two forms of gas, that is to say fresh air and gas drawn from the second part of the heating zone can be used for aiding in combustion or as tertiary air for adjusting the temperature of the hot gases.

Preferably the length of the cooling zone is so selected that the calcium sulphate emerging from it has a temperature suitable for further treatment, for instance in a grinding or milling device, so that the device is not damaged.

In certain cases gaseous products of combustion are supplied to the calcium sulphate at a pressure slightly above atmospheric pressure.

The method is carried and by an apparatus comprising: a moving grate; means cooperating with the grate in forming a heating chamber enclosing a heating zone; means for forming first and second plenum suction chambers underneath the moving grate and underneath the chamber; a chimney connected with the first plenum chamber and arranged for discharge of gas from the plenum chamber; means connecting the second plenum chamber with the heating chamber for discharge gas from this plenum chamber into the heating chamber, the length along the direction of movement of the grate of the first plenum chamber being such that gas drawn through calcium sulphate on the grate has a mean temperature lying just above the dew point; and means for leading air through the grate from under a cooling zone of the grate, downstream from the two plenum chambers, into the heating chamber. The suction gas plenum for the cooling zone is either separate from that used for the second part of the heating zone, or a single plenum chamber can be used for both. Preferably the suction plenum chamber for the cooling zone extends in the direction of movement of the grate that the calcium sulphate has a temperature suitable for further processing. If it is desired to cause a slightly supra-atmospheric pressure to obtain in the heating zone, the heating zone can conveniently be defined by a tunnel-like vaulted masonry structure, and a curtain of heat resistant material hanging down and making contact with the calcium sulphate on the moving grate. Such a heat resistant curtain can advantageously consist of asbestos fabric and chains. With such a curtain which drags on the bed of calcium sulphate and adapts itself to agree with the profile of the surface of the bed so that the last remaining opening of the heating zone, that is to say the exit of the zone, is closed. The entry of the heating zone is closed by means for charging the calcium sulphate into the grate.

The apparatus also may have a fan arrangement placed to the side of the moving grate so as to reduce the height required by the installation. If, however, all necessary fan units were arranged to one side of the apparatus adjacent to each other, the result would be that an excessive amount of the hot gas would be drawn through the calcium sulphate bed on this side and thus to an uneven dehydration and excessive heating of the moving grate on one side. In accordance with a particular form of the invention using three fan units, one of the fans connected with the second part of the heating zone can be arranged on one side of the moving grate while the other fans are arranged on the other side. In the case of the construction using only two fan units, the fan units can be arranged on opposite sides. The result is an equalling out during the course of the dehydration process.

When, owing to circumstances all fan units must be arranged on one side, means are provided to increase the resistance to flow through the grate on the side of the grate adjacent to the fans. In other words the grate is asymmetrical as regards the flow through it.

The instant inventive method brings about such an asymmetrical flow distribution by use of the following means, either in combination or separately:

(1) The moving grate can be so formed that the free cross-section decreases towards the fan side to such an extent that the rate of flow of hot gas through it over the whole width of the grate assumes an optimum value. In this case the moving grate can be provided with perforated sheet metal, woven wire or the like covering it whose permeability to air is less on the fan side than over the remainder of the cross-section of the grate.

(2) In placing the calcium sulphate in the grate, generally in several layers with different sizes of particles, the lowest layer, which has the finest particles, can be made higher on the fan side than on the remaining part of the grate. For this purpose use can advantageously be made of an adjustable template. If the grate is so designed that the decrease in free cross-section only brings about a coarse regulation of the desired asymmetrical cross-sectional characteristic is brought about, the placement of the fine calcium sulphate particles can be used for the purpose of finely adjusting the flow characteristic through the calcium sulphate and the grate. Such an adjustment can be carried out to take account of variations in the properties of the calcium sulphate, for instance as regards the water content.

Nonuniformity as regards the free cross-section of the grate and/or the height of the lowest layer of calcium sulphate can also be advantageous in those cases in which the inlets of the fans are arranged underneath the grate so as to be symmetrical about the centre line of the grate. If the calcium sulphate is banked to slope at the side, the two measures can be used to counter excessive dehydration of the calcium sulphate at the edges of the grate which might be caused by the comparatively high rate of gas flow through the calcium sulphate at the edges owing to the lesser height and therefore lower resistance to flow. In other words the lower finer layer is piled up at its edges so as to be higher than in the middle and thus reduce the flow through the grate at the edges. Such a piling up at the edges can be so high as to be 2 to 5 times the thickness of the bottom layer in the middle of the grate.

The use of an adjustable template enables a rapid change to be made in the resistance to flow by changing the profile of the upper surface of the lower layer, for instance to take into account a change in the moisture content of the bottom layer. In the case of the use of the two flow regulating measures, that is to say varying the thickness of the finest layer of material and decreasing the free flow cross-section of the grate towards the sides, the first measure can be used for fine adjustment and the second measure for coarse adjustment. In all cases the regulation of the depth as described above enables the evenness of dehydration to be substantially increased. This method of adjusting the degree of dehydration is extremely cheap since the amount of apparatus it makes necessary is minimal; a template is necessary in any case.

Embodiments of the invention are now described with reference to the accompanying drawings.

Figure 1:
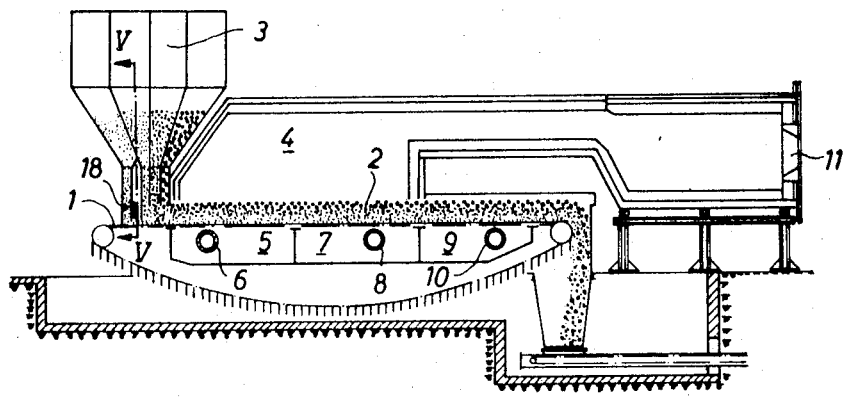
FIG. 1 is a longitudinal section through a first moving grate apparatus.
Figure 2:
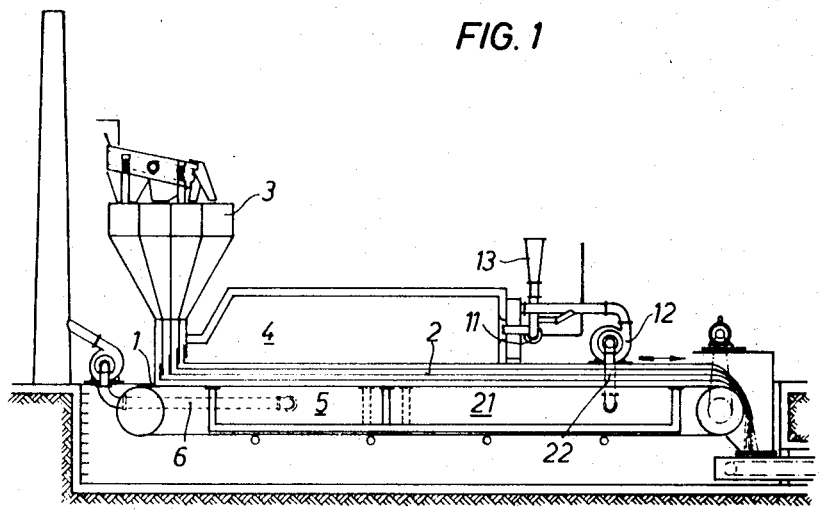
FIG. 2 is a longitudinal section through a different moving grate apparatus.

In all figures the moving grate is denoted by reference numeral 1 while reference numeral 2 denotes the bed of calcium sulphate, for instance gypsum. The supply container for the gypsum is denoted by reference numeral 3 while 4 denotes a heating chamber enclosed by the grate 1 below and by a tunnel-like structure above. Below the grate there are plenum suction chambers 5, 7 and 9. The first suction chamber 5 has a discharge duct 6 leading via a fan to the chimney. The second suction plenum chamber 7, underlying the second part of the heating zone, is connected by means of a discharge duct 8 with the heating zone. Finally the suction chamber 9 under a cooling zone of the grate is connected by means of a discharge duct 10 with the heating zone and a burner denoted diagrammatically by reference numeral 11 for supplying burning fuel to the heating zone. In the installation shown in FIG. 2 the suction plenum of the second part of the heating zone and the suction plenum of the cooling zone are in the form of a single suction plenum 21 whose discharge duct 22 is connected via a fan or blower 12 with the heating chamber 4 for the supply of secondary air to it. The burner 11 for heating the heating zone draws primary air through a tube 13.

Figure 3:
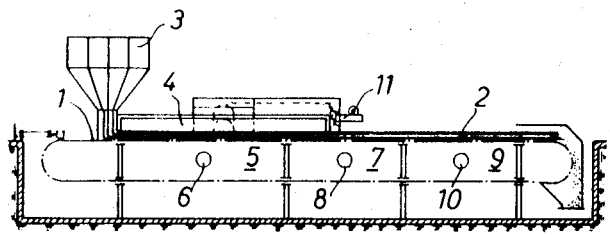
FIG. 3 is a longitudinal section through a third moving grate apparatus.

FIG. 3 shows a further form of apparatus or installation for carrying out the invention in which the plenum 7 partially underlies the heating zone and partially the cooling zone.

Figure 4:
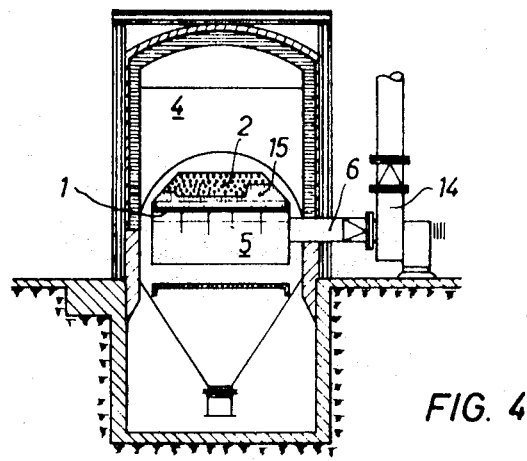
FIG. 4 is a cross-section through a fourth moving grate apparatus similar to those shown in FIGS. 1 to 3.
Figure 5:
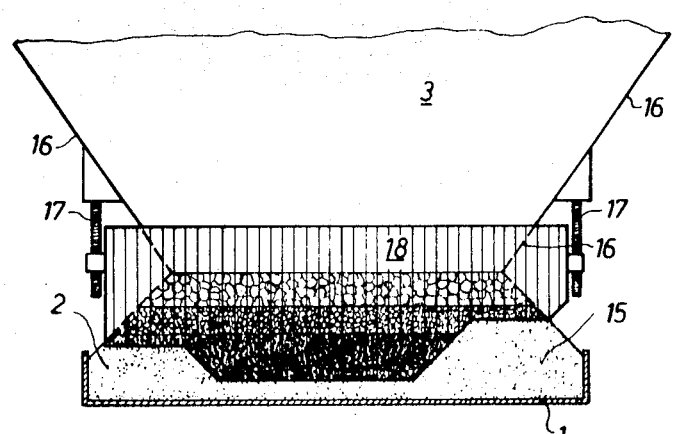
FIG. 5 shows an enlarged cross-section substantially on the line V—V of FIG. 1.

In the apparatus in accordance with FIG. 4 a further fan or blower 14 is provided to the side which is connected with the suction plenum 5 and propels waste gas, that is to say products of combustion into the chimney. Furthermore FIG. 4 shows how the lowermost, finest bed or layer of calcium sulphate can be banked up asymmetrically at the sides. The higher bank 15 on the right hand side is shown on a larger scale in FIG. 5, which also shows the shape 16 of the rear wall of the container of the calcium sulphate receiving silo 3 and the template 18 which can be moved upwards and downwards by means of threaded spindles 17 for giving the lower layer of calcium sulphate the required upper profile.

Figure 6:
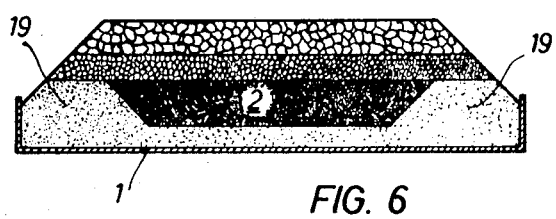
FIG. 6 shows a moving grate with a lowermost layer of calcium sulphate which is banked on both sides so as to be thicker than in the middle.

The form of the lowermost layer shown in FIG. 6 with banks 19 at the two sides of the grate 1 so as to be symmetrical is used when the fan unit or the opening of its duct is arranged in the middle of the grate. This banking up of the bottom layer can also be produced by the use of a suitable template.

What I claim is:

1. A method for heating calcium sulphate to remove water from it comprising placing the calcium sulphate in at least two layers on a moving grate, a lower layer having a transversely and upwardly concave upper surface, and an upper layer having an upper exposed surface which is upwardly convex in transverse section, the two layers being made up of calcium sulphate with approximately the same size particles in each layer, the particles in the lower layer being smaller than those in the upper layer, and passing heated gas downwardly through the layers.

2. A method in accordance with claim 1 in which at its edge portions the lower layer is 2 to 5 times as high as in the remaining portion.

3. A method in accordance with claim 1 in which the grate has a smaller free cross-section per unit area at positions adjacent to its edges, the free cross-section of the grate being the openings through which the gases pass and giving a rough regulation of the gas flow resistance through the calcium sulphate.

4. A method in accordance with claim 1 in which the lower layer is higher at a position adjacent to the side of the grate through which more gas is drawn through.

5. A method in accordance with claim 4 in which the thickness or height of the lower layer is used to produce a fine regulation of the gas flow resistance through the calcium sulphate.

6. A method in accordance with claim 3 wherein the smaller free cross-section per unit area of the grate is adjacent the side of the grate through which more gas is drawn through.

7. A method in accordance with claim 1 comprising the further step of shaping at least one layer directly on the grate with an adjustable template.

References Cited

UNITED STATES PATENTS

| | | | |
|---|---|---|---|
| 1,877,137 | 9/1932 | Lee | 34—25 UX |
| 2,152,167 | 3/1939 | Ahlmann | 34—25 |
| 2,383,694 | 8/1945 | Steiner | 34—25 X |
| 2,578,357 | 12/1951 | Syslop | 34—25 |
| 2,819,539 | 1/1958 | Rausch et al. | 34—9 |

FOREIGN PATENTS

| | | | |
|---|---|---|---|
| 476,594 | 12/1937 | Great Britain | 34—25 |

FREDERICK L. MATTESON, Primary Examiner

R. A. DUA, Assistant Examiner

U.S. Cl. X.R.

34—33